US005457644A

United States Patent [19]

McCollum

[11] Patent Number: 5,457,644

[45] Date of Patent: Oct. 10, 1995

[54] FIELD PROGRAMMABLE DIGITAL SIGNAL PROCESSING ARRAY INTEGRATED CIRCUIT

[75] Inventor: John L. McCollum, Saratoga, Calif.

[73] Assignee: Actel Corporation, Sunnyvale, Calif.

[21] Appl. No.: 109,727

[22] Filed: Aug. 20, 1993

[51] Int. Cl.[6] .................................. G06F 7/38; G06G 7/12

[52] U.S. Cl. .............................. 364/716; 326/41; 326/40; 364/600

[58] Field of Search .................................... 364/716, 600; 307/465–469; 340/825.83–825.91; 326/37, 38, 39, 40, 41, 47, 56

[56] References Cited

U.S. PATENT DOCUMENTS

| | | | |
|---|---|---|---|
| 4,870,302 | 9/1989 | Freeman | 326/41 |
| 5,107,146 | 4/1992 | El-Ayat | 326/41 |
| 5,200,751 | 4/1993 | Smith | 341/147 |
| 5,231,588 | 7/1993 | Agrawal et al. | 364/716 |

*Primary Examiner*—Roy N. Envall, Jr.
*Assistant Examiner*—Emmanuel L. Moise
*Attorney, Agent, or Firm*—D'Alessandro & Ritchie

[57] ABSTRACT

A field programmable, digital signal processing integrated circuit is formed in a semiconductor die and includes an array of arithmetic logic (ALU) circuits. A user programmable interconnect architecture is superimposed on the array of ALU circuits. One or more interface circuits comprising digital-to-analog (D/A) converters or analog-to-digital (A/D) converters are provided on the integrated circuit to interface to off-chip analog input signals and provide off-chip analog output signals. Circuitry is provided to program the interconnections between the interface circuits and the ALU circuits and between individual ones of the ALU circuits, as well as to define the specific functions of the individual ALU circuits.

5 Claims, 9 Drawing Sheets

| CLK | EN | INR IN | READ FLOW | SET FLOW | LATCH A | INR OUT | LATCH B | DATARDY |
|---|---|---|---|---|---|---|---|---|
| ↑ | 1 | 1 | X | 1 | 1 | 1 | 0 | 0 |
| ↑ | 0 | X | X | | 0 | 0 | 0 | 0 |
| ↑ | X | 0 | X | | 0 | 0 | 0 | 0 |
| ¬ | X | X | 1 | 0 | 0 | 0 | 1 | 1 DELAY |
| ¬ | X | X | 0 | 0 | 0 | 0 | 0 | 0 |

*FIG. 2B*

FIELD PROGRAMMABLE DIGITAL SIGNAL PROCESSING ARRAY INTEGRATED CIRCUIT

BACKGROUND OF THE INVENTION

1. Field of the Invention

The present invention relates to integrated circuits and, more specifically, to user-programmable integrated circuits. More particularly, the present invention relates to user-programmable mixed analog and digital integrated circuits.

2. The Prior Art

General purpose linear integrated circuits have limited themselves to specific functions such as operational amplifiers, phase locked loops, comparators, A/D converters, video amplifiers, transistor arrays, etc. These circuits form the building blocks of analog systems. Integrating these circuits into higher functions is difficult due to the need to employ external components (i.e., resistors, capacitors, inductors, etc.) to determine their exact function. Thus once integrated, these circuits become specialized, In order to be practicable for design, manufacture, and sale, such a specialized part must have a large usage base. One illustrative example of such a circuit is an audio amplifier which may be used in stereo systems or television sets. Without a large usage base, the design and manufacture of such a circuit is not economical.

During the manufacture of analog circuits a significant cost is the final trimming of each individual circuit. This is required because component values vary as well as stray capacitance due to component placement.

Another common problem in electronics is that various parts of a complex signal need to be kept in phase while utilizing different circuit paths. This is commonly done in color television sets where the luminance information is routed through a delay line while the chrominance information is processed.

Furthermore, many common analog systems such as television sets, VCR's and stereo systems are currently employing many digital functions. Hence the integration of these circuits onto a single integrated circuit die requires mixed analog and digital design and a process to manufacture them. The manufacturing process for such integrated circuits is complex and expensive as the transistors used in analog circuit design are typically radically different from those used in digital design.

One prior-art approach to this problem has been to design circuits which operate employing digital signal processing (DSP) techniques. These devices use a microprocessor core to simulate the mathematical equivalent of the analog system. One common application for such chips is digital filtering of the signals before conversion back to the analog world.

A fundamental limitation of these integrated DSP devices is that the device speed is limited by the Von Neuman architecture of the microprocessor where many processor functions are required for each time slice of the analog signal. This limitation has heretofore limited the speed of such devices to frequencies in the audio spectrum. This is of course due to the fact that the customization of the function is achieved by the coding of the instructions in the microprocessor.

Another approach to the mixed analog and digital integrated circuit is shown in U.S. Pat. No. 5,107,146 to El-Ayat. This patent discloses a user-programmable architecture including a mixture of analog and digital circuit modules. The digital logic modules are of the type used in prior field programmable gate array (FPGA) devices.

Work has been done in the past in trying to design processor arrays to speed up applications. These class of machines are called MIMD or SIMD (multiple instruction multiple data or single instruction multiple data). These concepts utilize a plurality of processor engines to perform logical operations, such as multiplication and division. Each processor engine is a Von Neuman machine and occupies significant die area on an integrated circuit.

It is an object of the present invention to provide a user-programmable digital signal processing integrated circuit which overcomes the limitations of the prior art.

It is another object of the present invention to provide a user-programmable digital signal processing integrated circuit which does not require individual trimming to maximize performance.

Yet another object of the present invention is to provide a user-programmable digital signal processing integrated circuit which allows the user to control phase shifting of signals being processed therein.

It is a further object of the present invention to provide a user-programmable digital signal processing integrated circuit which may be easily programmed by a user.

BRIEF DESCRIPTION OF THE INVENTION

According to the present invention, a field programmable, digital signal processing integrated circuit is formed in a semiconductor die and includes an array of arithmetic logic unit (ALU) circuits. A user programmable interconnect architecture is superimposed on the array of ALU circuits. One or more interface circuits comprising digital-to-analog (D/A) converters or analog-to-digital (A/D) converters are provided on (or off) the integrated circuit to interface to off-chip analog input signals and provide off-chip analog output signals. Other functional circuit blocks, such as programmable read only memory (PROM) or Random Access Memory (RAM) circuits may also be disposed on the integrated circuit die. Circuitry is provided to program the interconnections between the interface circuits and the ALU circuits and between individual ones of the ALU circuits, as well as to define the specific functions of the individual ALU circuits.

The architecture of the present invention avoids the Von Neuman bottle neck characteristic of prior art systems by eliminating the need for sequential instructions. Each ALU circuit of the present invention may be user customized to act like the mathematical equivalent of an analog circuit element. The individual ALU circuits are interconnected to one another and to A/D and D/A interface circuits by user-programmable interconnect elements.

BRIEF DESCRIPTION OF THE DRAWINGS

FIG. 2*b* is a state diagram which discloses in detail the operation of the control circuit portion of the ALU circuit of FIG. 2*a*.

DETAILED DESCRIPTION OF A PREFERRED EMBODIMENT

Those of ordinary skill in the art will realize that the following description of the present invention is illustrative only and not in any way limiting, Other embodiments of the invention will readily suggest themselves to such skilled persons.

Figure 1:
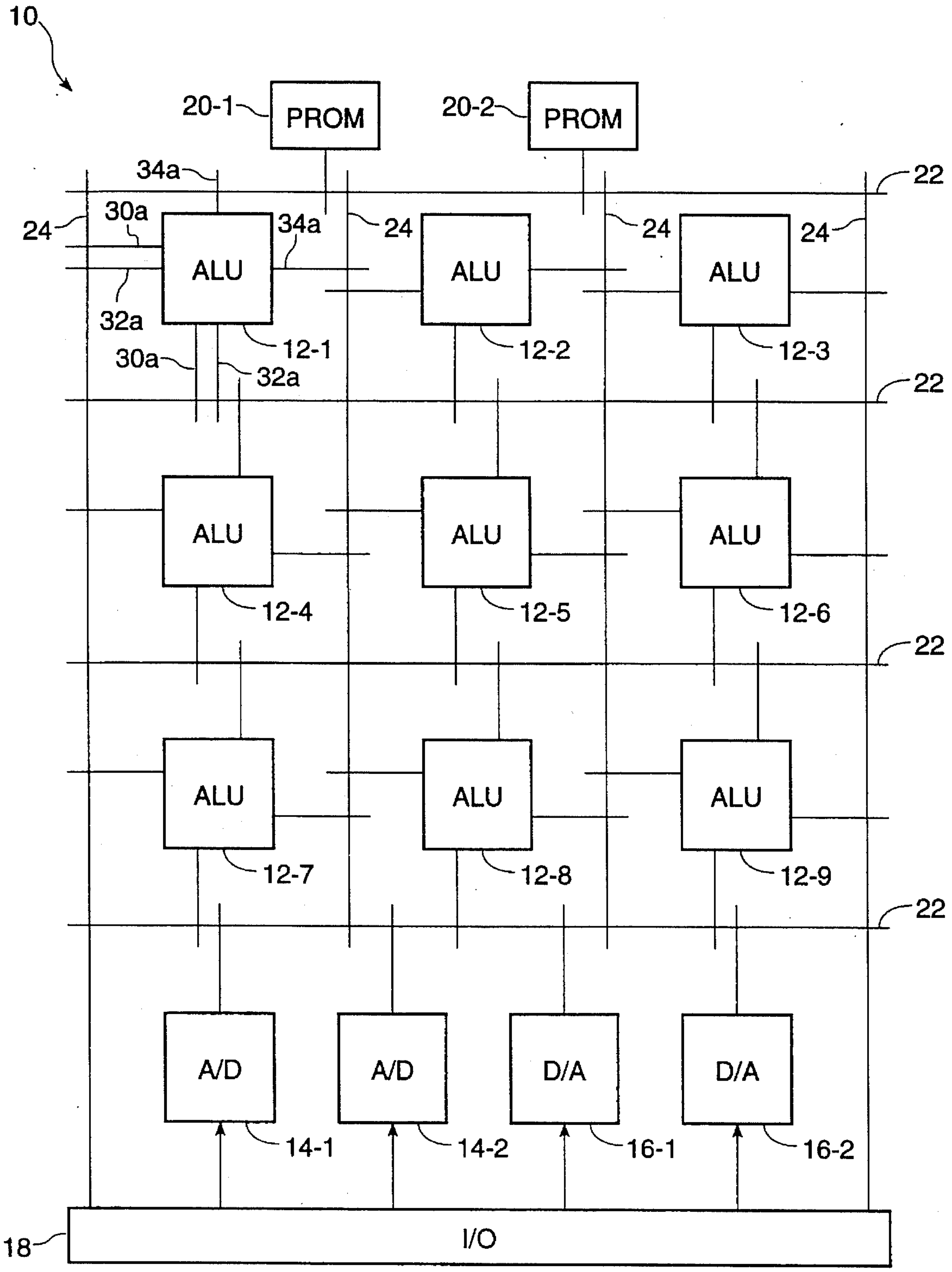
FIG. 1 is a block diagram of the architecture for an illustrative field programmable digital signal processing integrated circuit according to a preferred embodiment of the present invention.

Referring first to FIG. 1, a block diagram is presented of the architecture for an illustrative field programmable digital signal processing integrated circuit according to a preferred embodiment of the present invention. The architecture of the present invention is integrated on a single piece of semiconductor material, and may be fabricated using known semiconductor processing technology, such as CMOS technology, which is presently preferred.

The field programmable digital signal processing integrated circuit 10 of the present invention is built around an array of unit ALU circuits shown at reference numerals 12-1 through 12-9. For purposes of illustration, arithmetic logic units 12-1 through 12-9 are shown arranged as a regular array comprising three rows and three columns of ALU circuits. Those of ordinary skill in the art will readily observe that the architecture and arrangement of FIG. 1 is illustrative only and not limiting, in that such skilled persons will readily recognize that other numbers of ALU circuits and other layout arrangements may be employed.

At least one analog to digital (A/D) converter and at least one digital to analog (D/A) converter circuit may be optionally disposed on the integrated circuit along with the ALU circuits. In the illustrative embodiment of FIG. 1, two A/D circuits 14-1 and 14-2 and two D/A circuits 16-1 and 16-2 are shown. In an actual embodiment of the integrated architecture of the present invention, A/D converters 14-1 and 14-2 and D/A converters 16-1 and 16-2 will probably be located near the periphery of the integrated circuit die upon which the architecture 10 of the present invention is disposed, but those of ordinary skill in the art will understand that placement of these devices is largely a matter of design choice. Such elements may even be located off chip in certain applications.

As in any integrated circuit, a plurality of input/output (I/O) pins are provided for supplying power to the integrated circuit and for transporting electrical signals onto and off of the integrated circuit. The number of I/O pins provided on any actual embodiment of the architecture of the present invention will be purely a matter of design choice. A group of such I/O pins is depicted as a single I/O block 18, but those of ordinary skill in the art will recognize that I/O block 18 represents a plurality of I/O pins.

Other functional circuit blocks may be disposed in the integrated circuit along with the other previously-described elements. For example, and as shown in FIG. 1, PROM devices 20-1 and 20-2 are shown disposed in the integrated circuit architecture 10 of the present invention. Those of ordinary skill in the art will realize that other types of circuit elements, such as RAM and ROM circuits, may be usefully employed in the architecture of the present invention.

Finally, a user-programmable interconnect architecture is superimposed upon the aforementioned circuit elements. The user-programmable interconnect architecture is used to connect the aforementioned circuit elements to one another and to the I/O pins.

User-programmable interconnect architectures include a plurality of interconnect conductors which may be connected to one another, to inputs and outputs of the various circuit elements, and to the I/O pins by user-programmable interconnect elements. These user-programmable interconnect elements may take several forms as is known in the art. Examples of such elements include antifuses, of which there are numerous known examples, such as those disclosed in U.S. Pat. Nos. 4,899,205 and 5,070,384, 5,181,096, and pass transistors, such as disclosed in the architecture described in U.S. Pat. No. 4,870,302. Those of ordinary skill in the art will recognize that these examples are non-exhaustive and merely illustrate the state of the user-programmable interconnect element art. Unless specifically noted otherwise herein, the meaning of the term user-programmable interconnect element as used herein shall be construed to cover all forms of such interconnect elements. The structure, design, and use of such user-programmable interconnect elements is well known in the art and will not be recited herein.

In FIG. 1, the user-programmable interconnect architecture is shown diagrammatically as horizontal interconnect conductors 22 and vertical interconnect conductors 24 which are distributed throughout and among the circuit elements of FIG. 1. Those of ordinary skill in the art will recognize that FIG. 1 is very general in this respect. The lines identified by reference numerals 22 and 24 in the drawing figure are not intended to represent individual interconnect conductors but rather represent groups of conductors. An actual arrangement of interconnect conductors useful for employment in the present invention will be disclosed in subsequent figures and text herein.

In actual embodiments of the architecture of the present invention, some of the conductors will be segmented and some conductors may run the entire length or width of the array of circuit elements in the architecture. Individual user programmable interconnect elements will be connected between selected adjacent segments of the interconnect conductors to selectively lengthen them, and other individual user-programmable interconnect elements will be positioned between intersecting horizontal and vertical segments of the interconnect conductors. Nonexhaustive examples of the segmenting of individual interconnect conductors are seen in U.S. Pat. Nos. 4,870,302, 4,758,745, and 5,073,729.

Those of ordinary skill in the art will understand that care must be taken in the design of the segmentation of the interconnect conductors. Normally, output signals from an ALU circuit will be passed to a nearest neighbor ALU immediately above, below, or to either side. However, some circuits (such as reactive circuits) need to feed the terms back very quickly, making short busses necessary. In addition, a signal must occasionally be fed a long distance as is the case of an AGC signal. Long buses will be needed to be used for these signals. Fortunately these are often slow responding signals and will not limit the circuit speed. Those of ordinary skill in the art will understand that it is preferable that as few user-programmable interconnect elements as possible should be interposed in a single signal path to minimize signal delay.

Although, in a normal circuit configuration defined by a user, most of the interconnect conductors comprising the interconnect architecture are shown on the digital side of the circuit, i.e., between the outputs of A/D converters 14-1 and 14-2 and the inputs of D/A converters 16-1 and 16-2, there are situations where it becomes advantageous to have access to the internal interconnect conductor groups from outside of the integrated circuit. According to one aspect of the present invention, the interconnect conductor groups may communicate with the I/O pins, either directly, as shown in FIG. 1 by leftmost and rightmost vertical interconnect conductor groups 24 entering I/O block 18, or through appropriate input and output buffers as is known in the art. This feature of the present invention allows a number of integrated circuits according to the present invention to be connected together to form larger circuits, which may be clocked together as will be described further herein.

Figure 2A:
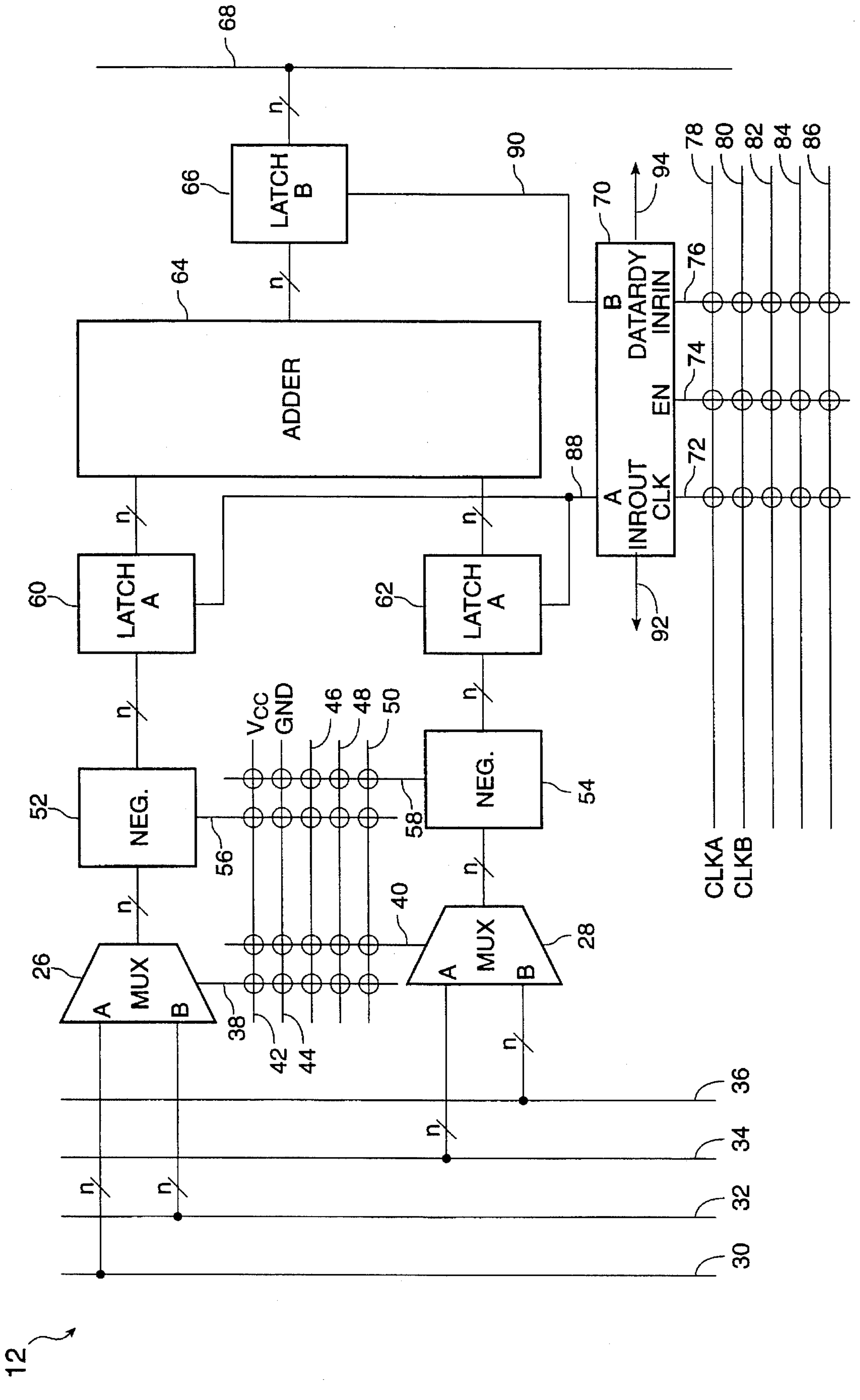
FIG. 2*a* is a block diagram of an illustrative ALU circuit suitable for inclusion in the field programmable digital signal processing integrated circuit according to the present invention.

Referring now to FIG. 2*a*, the structure and organization of a presently preferred single ALU circuit 12 suitable for use in the architecture of the present invention is depicted in block diagram form. ALU circuit 12 may be configured using standard CMOS building blocks for circuits of this type. Those of ordinary skill in the art will recognize that other ALU circuits and variations of the circuit presented in FIG. 2*a* are useable in the present invention.

According to a presently preferred embodiment of the present invention, ALU circuit 12 includes an first 2:1 multiplexer 26 and a second 2:1 multiplexer 28. Both the first and second multiplexers 26 and 28 are n-bits wide, where n is the width of the data byte used by the ALU circuit 12. The byte size used in any actual embodiment of the invention could be from 2–64 bits wide and will be dictated by resolution, size, and other design considerations. A typical byte size might be, for example, 8 bits. Practically a data byte would be the width of the A/D and D/A converters used. This would be for instance 8 or 10 bits in the case of Video D/A converters and 18 bits for Audio D/A converters.

For some applications however, variations on this structure may be necessary. For example, the voltage in tuned reactive circuits is Q (quality factor) times higher than the input voltage. Typically a Q may be as high as 100, which would require an extra 8 bits to be added to the ALU circuits 12 to accommodate the voltage, resulting in 16 to 18 bits for Video D/A converters. If the programmable circuit is optimized for reactive circuits, only the internal nodes of the reactive circuits need be this size. The rest of the ALU circuit 12 data paths could be 8 to 10 bits wide. Another solution to this problem would be to configure all of the ALU circuits 12 to be 8 to 10 bits wide and to program an AGC circuit consisting of a peak detector, a comparator and gain adjust circuit into the circuit to reduce the input signal amplitude to the reactive circuit module, thereby preventing the ALU circuit 12 from overflowing. Those of ordinary skill in the art will envision numerous other similar modifications of the basic architecture of the present invention.

Referring again to FIG. 2*a*, the data inputs (A and B) of first 2:1 multiplexer 26 are connected to n-wide input busses 34 and 36, and the data inputs (C and D) of second 2:1 multiplexer 28 are connected to n-wide input busses 32 and 34. Numerous other configurations are possible, but it is preferred that the input busses physically exit the ALU circuit 12 in different directions to maximize the interconnect possibilities. For example, one end of input busses 30, 32, 34, and 36 might exit the ALU block horizontally and one end may exit vertically to permit connection to both horizontal and vertical interconnect conductors in the interconnect matrix of the integrated circuit, thus allowing for greater interconnect possibilities. This is shown diagrammatically in FIG. 1 in the region of ALU circuit 12-1 at reference numerals 30*a*, 32*a*, and 34*a*. While only one ALU circuit 12-1 is shown having such an input structure in FIG. 1, in order to avoid cluttering up the drawing, those of ordinary skill in the art will recognize that it is preferable for all ALU circuits to be similarly configured.

The control inputs 38 and 40 of first and second 2:1 multiplexers 26 and 28 are brought to an interconnect matrix which includes conductor 42 carrying the Vcc potential for the integrated circuit, conductor 44 carrying ground potential, and general interconnect conductors 46, 48, and 50. The small circles in the interconnect matrix at the intersections of control inputs 38 and 40 and conductors 42, 44, 46, 48, and 50 represent user programmable interconnect elements, such as antifuses or pass transistors. Those of ordinary skill in the art will realize that the arrangement shown allows maximum flexibility in that the control inputs 38 and 40 of the multiplexers 26 and 28 can be hardwired to Vcc or ground to preselect the data source or can be hardwired to data sources via one of general interconnect conductors 46, 48, or 50 to dynamically alter the signal sources during circuit operation.

Those of ordinary skill in the art will recognizer that the multiplexed inputs of the ALU circuit 12 permit greater interconnect flexibility. Such persons will also recognize that, in some applications, these circuit elements will not be necessary.

The outputs of first and second 2:1 multiplexers 26 and 28 are directed to negate circuits 52 and 54. The function of negate circuits 52 and 54 is to selectively invert the data state of the input, and the circuits may be configured from exclusive 0R gates as is known in the art. The control inputs 56 and 58 of negate circuits 52 and 54 are brought into the interconnect matrix, thus allowing maximum flexibility of the negate function.

The outputs of negate circuits 52 and 54 drive the Latch A latches 60 and 62. The outputs of Latch A latches 60 and 62 form the input terms for adder 64. Adder 64 may be a conventional multibit adder circuit. The output of adder 64 drives the input of latch B 66. The output of Latch B 66 is connected to output bus 68.

The Latch A latches 60 and 62 and B Latch 66 are controlled by a control circuit 70. The purpose of control circuit 70 is to synchronize the operation of the ALU circuit to assure that the operation of the circuit is coordinated with the arrival of the correct data to be processed by the ALU circuit. Control circuit 70 has a clock (CLK) input 72, an enable (EN) input 74 and an input-ready in (INRIN) input 76. These inputs are incorporated into an interconnect matrix including two clock lines CLKA line 78, CLKB line 80, and three general interconnect conductors 82, 84, and 86. The input lines 72, 74 and 76 are connectable to any of lines 78, 80, 82, 84 and 86 by the user programmable interconnect elements shown as small circles at the intersections of the lines 78, 80, 82, 84 and 86 and the input lines 72, 74 and 76. Those of ordinary skill in the art will recognize that the connectivity choices shown in FIG. *2a* are only illustrative, and that the actual choices in an architecture built in accordance with the teachings of the present invention will be dictated largely as a matter of design choice.

Control circuit 70 has four outputs. Output A (line 88) drives the clocks of the Latch A Latches 62 and 62, and output B (line 90) drives the clock of the Latch B, latch 66. INROUT line 92 is used for asynchronous connection of modules and is an input-read output signal which would be connected to the input-read (INRIN) input of the module connected upstream so that the upstream module will release data on the next clock. DATARDY line 94 is a data ready output used to indicate that data is valid for the next module downstream to read.

Those of ordinary skill in the art will recognize that, by using the negate circuits 52 and 54 and the multiplexers 26 and 28, the ALU circuit 12 of FIG. *2a* may be configured to perform the customary logical functions performed by ALU circuits.

Referring now to FIG. *2b*, a state diagram is presented, showing in detail the operation of the control circuit 12 portion of the ALU circuit of FIG. *2a*. Those of ordinary skill in the art will recognize that synchronous stages will not need to utilize the INRIN and INROUT lines 76 and 92. Asynchronous stages, however, will use the INRIN and INROUT lines 76 and 92 at the interface. Occasional bytes may be lost, but this should not affect the overall operation of any circuits configured using the architecture of the present invention. Lost bytes may be averaged out by (A+B)/2 of subsequent data bytes until smoothness level is achieved, so long as the number of data samples per cycle are adequate.

Those of ordinary skill in the art will recognize that variations of the architecture of the ALU module 12 of the present invention are possible and are intended to fall within the scope of the present invention. For example, internal memory could be provided in the ALU modules 12 for instructing them to perform more than one function and thus increase their flexibility. However, such skilled persons will recognize that, in its limit, such an embodiment will suffer from the Von Neuman bottleneck problem of prior art architectures.

The organization of the interconnect architecture of the present invention makes it possible to utilize the interconnect itself to perform mathematical functions such as multiply and divide. This feature of the present invention is advantageous in that such operations may be performed in the same clock cycle as the operations performed by the ALU circuit whose output is driving the interconnect conductors.

The speed will be limited by the rate at which the ALU circuits can perform an addition (subtraction) and a multiplication (division). The multiplication and division are the mathematical processes that take the most time. If however the application circuit is designed to use circuit elements such as resistors, capacitors inductors etc. in units of the power of 2, i.e. 2, 4, 8, 16 etc., the multiplication and division may be digitally represented by a shift left or a shift right operation.

Figure 3:
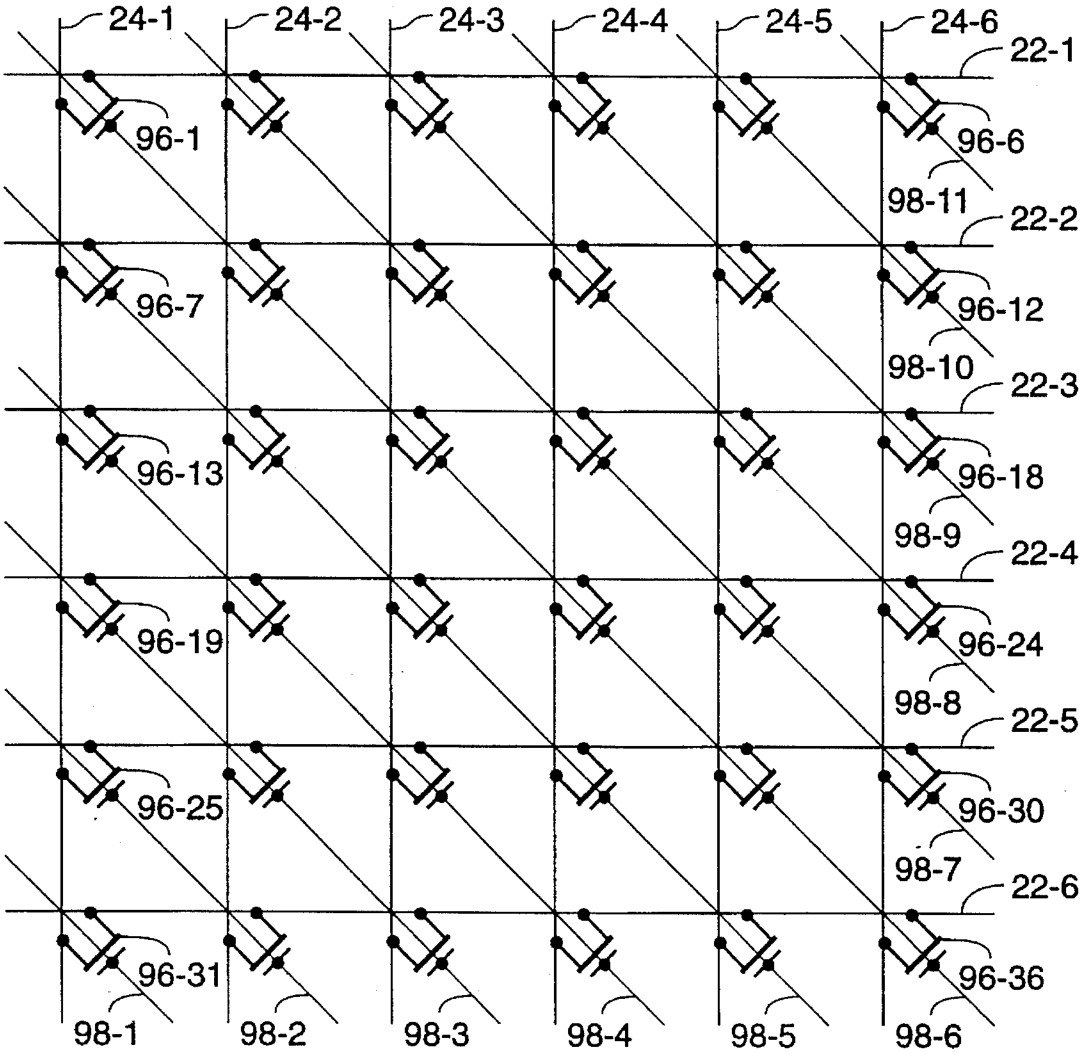
FIG. 3 is a schematic diagram of an architecture for a bus interchange which can perform a single or multibit shift operation.

As previously mentioned, these shifts can be built into the interconnect architecture. An exemplary scheme for performing such an operation is shown in FIG. 3. FIG. 3 shows a plurality of horizontal interconnect conductors 22-1 through 22-6 intersecting a plurality of vertical interconnect conductors 24-1 through 24-6. At each intersection, a transistor 96-1 through 96-36 is connected between the horizontal and vertical interconnect conductors. The gates of diagonally-situated ones of the transistors are connected together to one of gate lines 98-1 through 98-11

Those of ordinary skill in the art will appreciate that transfer of data from conductors 22-1 through 22-6 to corresponding ones of 24-1 to 24-6 will take place when gate line 98-6 is activated. Data can be shifted one bit in a first direction in the transfer if gate line 98-5 is activated, two bits if gate line 98-4 is activated, three bits if gate line 98-3 is activated, and so on. Similar shifting will take place a selected number of bits in the other direction if one of gate lines 98-7 through 98-11 is selected.

Those of ordinary skill in the art will recognize that this bit shifting technique can be implemented by other user-programmable interconnect devices such as antifuses. In such an embodiment, intersecting conductive lines may be connected by antifuses and the bit shifting to the left or right may be accomplished by selective programming of the antifuses.

A bus interchange like that depicted in FIG. 3 may be placed at the intersection of horizontal and vertical interconnect conductors such as 22 and 24 and may also be employed to connect an input bus or output bus of an ALU circuit to the horizontal and vertical interconnect busses of the interconnect architecture. It is apparent that the multiplication and division operations implemented by the shift function disclosed herein will take no significant time, and will certainly occur in the same clock cycle used to operate the driving ALU circuit. Hence those of ordinary skill in the art will appreciate that the architecture of the present invention can perform functions with the same approximate speed as high speed analog operational amplifiers.

As an example of the use of this technique, an ALU circuit functioning as a digital resistor receives two multibit digital values representing the voltages across its terminals and outputs a multibit digital value representing the current through it by the function $I=(V_A-V_B)/R$, where R represents its resistance. The value of R as any power of 2 may be preprogrammed into the ALU circuit by shifting the output bus one or more bit positions. This function could be achieved in one clock cycle and the digital resistor performs the same function on each clock cycle i.e. subtract two input numbers and divide by a preprogrammed constant. Hence the architecture of the present invention eliminates the need for program storage. Similarly a capacitor would be V=Vo+(I/C), where the inputs are currents and the output is a voltage. The division operation for calculating capacitances whose values are powers of 2 is automatically performed as a result of a bit shift of one or more places in the opposite direction from that for a multiplication operation. Similar simple functions exist for inductors and transformers and operational amplifiers, comparators, ideal diodes, switches or multiplexers, which are the building blocks of analog electronics.

In an integrated circuit of the present invention, the user-programmed interconnect of the digital ALU circuits would be a one-to-one map of the analog equivalent. The additional integration of digital signals is simple because the digital gates would be made of the same type of transistors for digital circuits. The digital modules may use similar logic as is currently available in Gate arrays, FPGA's and PAL's. The interconnection of the analog elements may of course be made in the same manner as used in Gate arrays, FPGA's and PAL's.

An integrated circuit according to the present invention is easily customizable, suitable for mixing analog and digital functions, and can be extremely fast, capable of working with analog signals in the RF and Video frequency ranges. The limiting frequency will likely be the rate of A/D and D/A conversions at the boundaries of the system. Flash converters currently work in the tens of megahertz. The A/D and D/A converters could either be on chip or off chip depending on the desire of the designed/manufacturer.

Figure 4A:
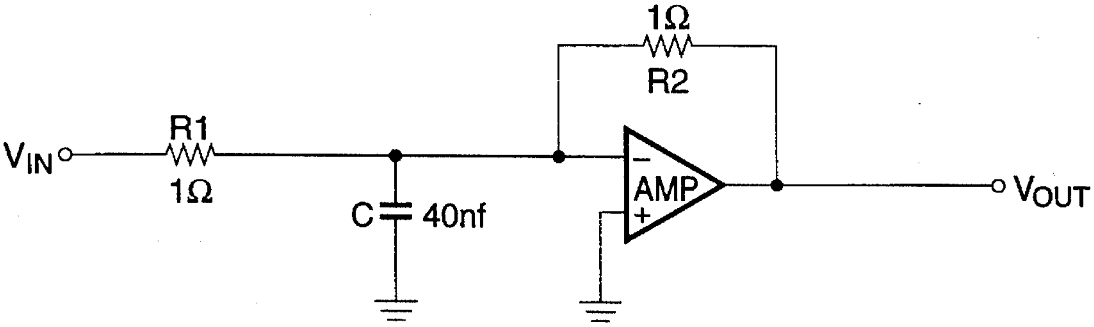
FIG. 4*a* is a schematic diagram of a simple inverting analog amplifier.
Figure 4B:
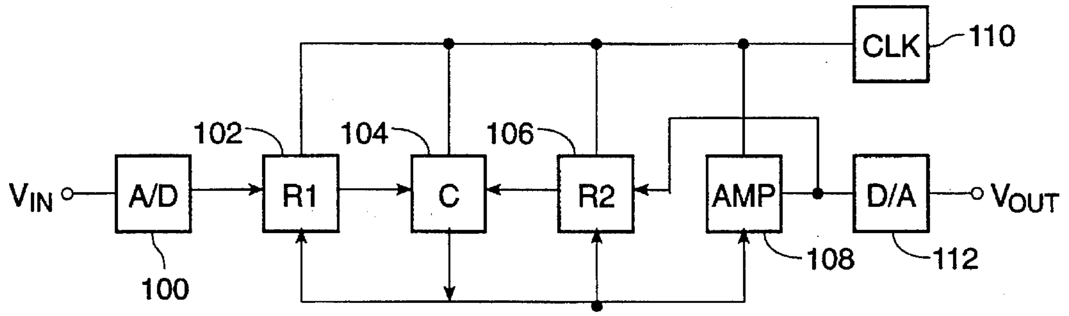
FIG. 4*b* is an equivalent block diagram of the amplifier of FIG. 4*a* implemented according to the present invention.

Referring now to FIGS. 4*a* and 4*b*, a simple design of an inverting unity gain amplifier is shown as an example of the operation of the architecture of the present invention. FIG. 4*a* is a schematic diagram of the analog equivalent circuit including two one ohm resistors, a 40 nF capacitor, and an amplifier having a slew rate of 0.25 $V/V_{IN}$. FIG. 4*b* is a block diagram of the digital equivalent circuit as implemented in the architecture of the present invention. An analog input voltage is supplied to A/D converter 100, which presents its output to ALU 102, programmed to behave as the resistor R1 in the circuit of FIG. 4*a*. ALU 104 is programmed to behave as capacitor C, ALU 106 is programmed to behave as resistor R2, and ALU 108 is programmed to behave as the amplifier element. The entire circuit is driven by a 100 MHz clock 110. ALU 102 (resistor 1) computes the value $I_1=(V_{IN}-V_1)/1\ \Omega$. ALU 104 (capacitor C) computes the value $V_1=V_{1prev}+(I_1+I_2)(10\ \text{nsec}/40\ \text{nF})$, where $V_{1prev}$ is the voltage from the previous clock cycle and 10 nsec is the period of the clock signal. ALU 106 (resistor 2) computes the value $I_2=(V_{OUT}-V_1)/1\ \Omega$. Finally, ALU 108 (the amplifier) computes the value $V_{OUT}=(V_{OUT\,prev}+(-0.25)V_1)$.

Figure 4C:
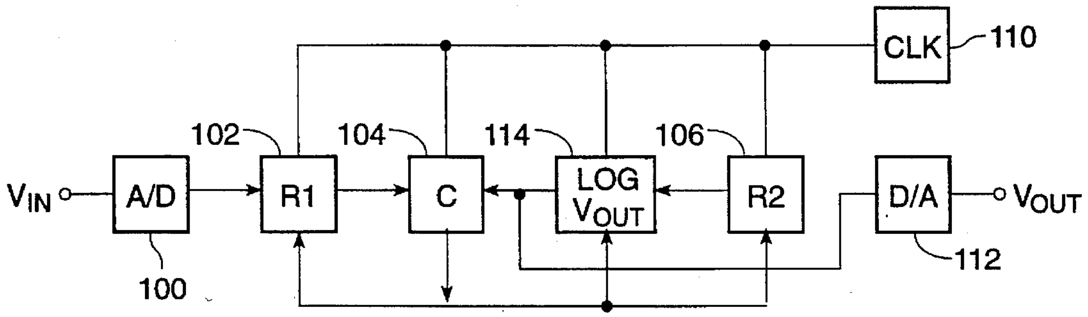
FIG. 4*c* is an equivalent block diagram of the amplifier of FIG. 4*a* implemented according to the present invention and including a logarithmic feedback element.

If one or (if necessary) both of the PROM elements 20-1 or 20-2 are used in place of the feedback loop of the amplifier, special non-linear transforms, such as logarithmic output of the amplifier, can be implemented. The data stored at each address is simply the log of the address value. Such a variation of the amplifier circuit is shown at FIG. 4*c*. Those of ordinary skill in the art will recognize that the log function generator 114 may be implemented by use of a ROM look-up table.

Figure 5:
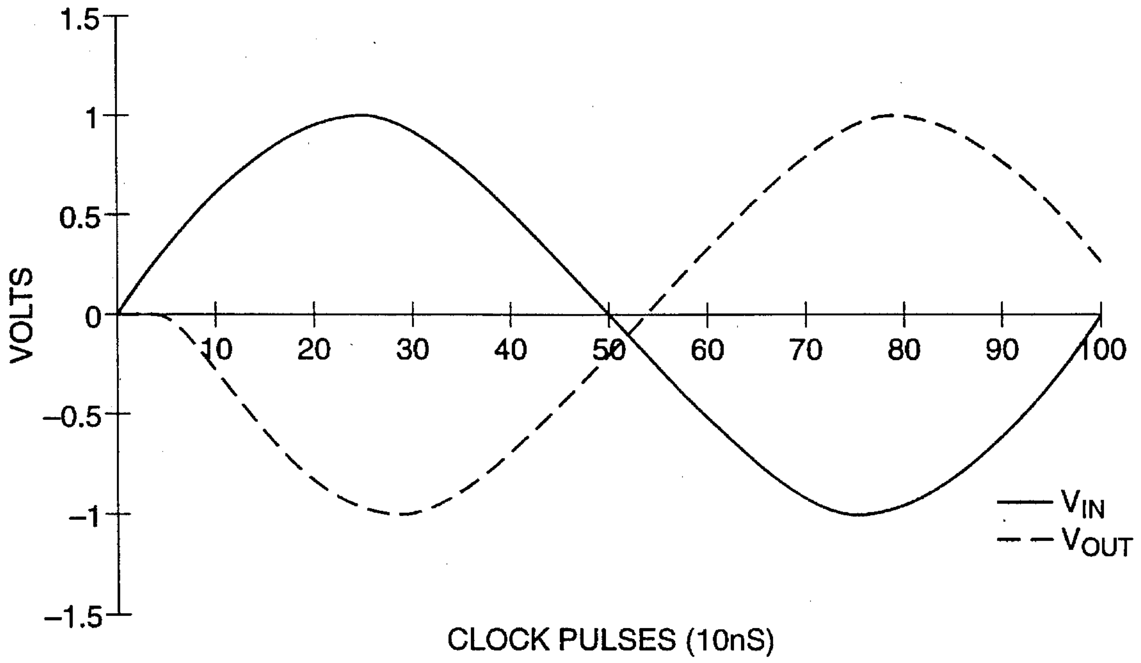
FIG. 5 is a graph showing the waveforms of the signal input and signal output waveform of the circuit of FIG. 4*b* for a sinusoidal input waveform.

FIG. 5 is a graph showing the waveforms of the signal input and signal output waveform of the circuit for a sinusoidal input waveform. It may be seen from FIG. 5 that the output of the amplifier is somewhat "phase shifted" due to the pipelining time for the data through the ALU system which emulates the analog amplifier.

Figure 6:
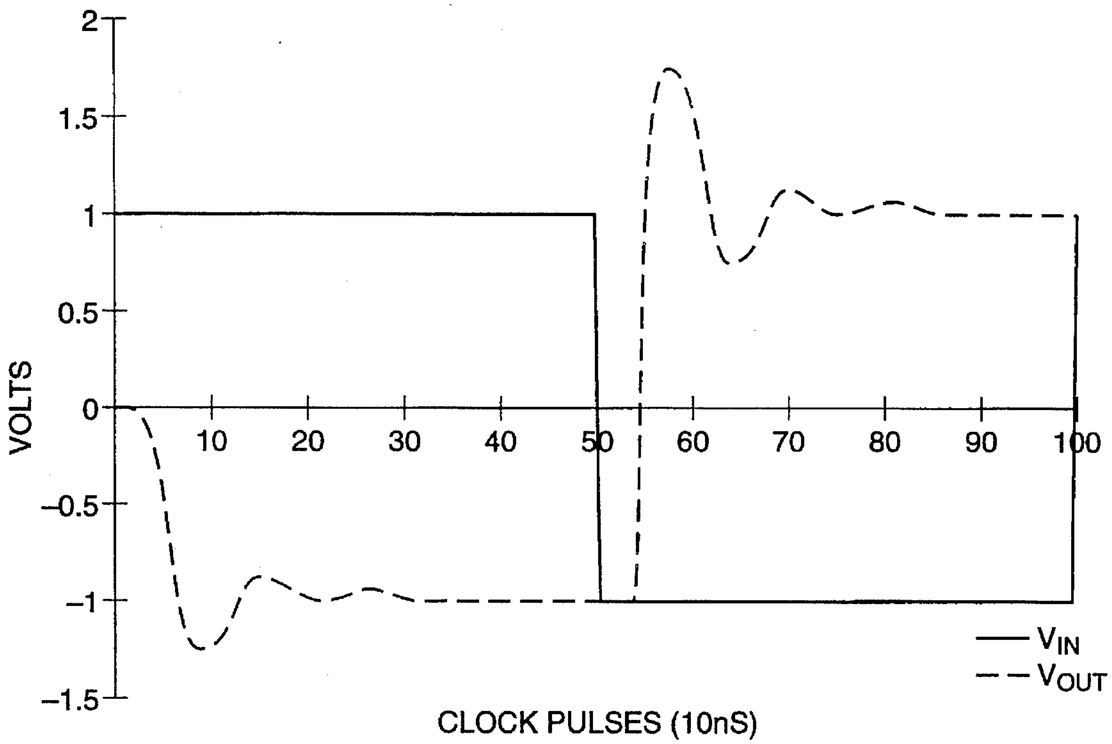
FIG. 6 is a graph showing the waveforms of the signal input and signal output waveform of the circuit of FIG. 4*b* for a square input waveform.

FIG. 6 is a graph showing the waveforms of the signal input and signal output waveform of the circuit of FIG. 4*b* for a square input waveform. The damped overshoot characteristic which is typical of analog amplifiers may be seen on the output waveform.

Figure 7A:
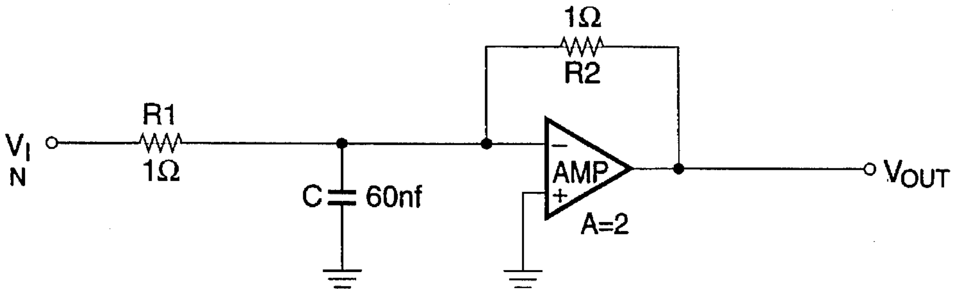
FIG. 7*a* is a schematic diagram of a variation of the amplifier circuit of FIG. 4*a*.
Figure 7B:
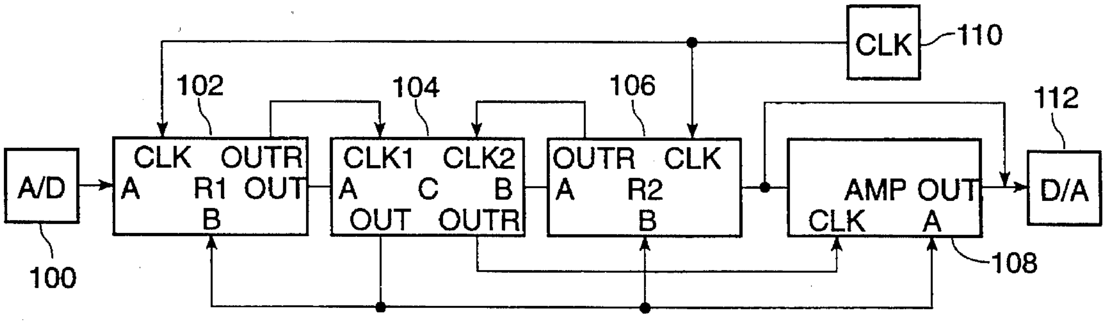
FIG. 7*b* is an equivalent block diagram of the amplifier of FIG. 7*a* implemented according to the present invention in a manner which avoids pipelining distortion in the output.

According to another aspect of the present invention, re-arranging the architecture of the emulated amplifier circuit can eliminate the distortion exhibited by the circuit of FIG. 4*b* which is apparent in FIGS. 5 and 6. Referring now to FIGS. 7*a* and 7*b*, an alternate configuration can be configured by employing a slower master clock and using the data-valid (INR and OUTR) connections of the ALU circuits. For convenience, the same reference numerals are used in the circuits of FIGS. 4*b* and 7*b*, but the capacitor C has a value of 60 nF and the amplifier has a gain of 2.

In the circuit of FIG. 7*b*, the calculations in the R1 and R2 ALU circuits (reference numerals 102 and 106) are performed first. Specifically, R1 ALU calculates $I_1=(V_{IN}-V_1)/1\ \Omega$ and R2 ALU calculates $I_2=(V_{OUT}-V_1)/1\ \Omega$. The C ALU (reference numeral 104) calculates $V_1=V_{1prev}+(I_1+I_2)(30\ \text{nsec}/60\ \text{nF})$. This ALU is not clocked until the OUTR outputs of R1 and R2 ALU circuits 102 and 106 are true, indicating that the data at their outputs is valid. The AMP ALU 108 calculates the value $V_{OUT}=V_{OUTprev}-2V_1$ and is not clocked until the OUTR output of ALU circuit 104 is true.

Figure 8:
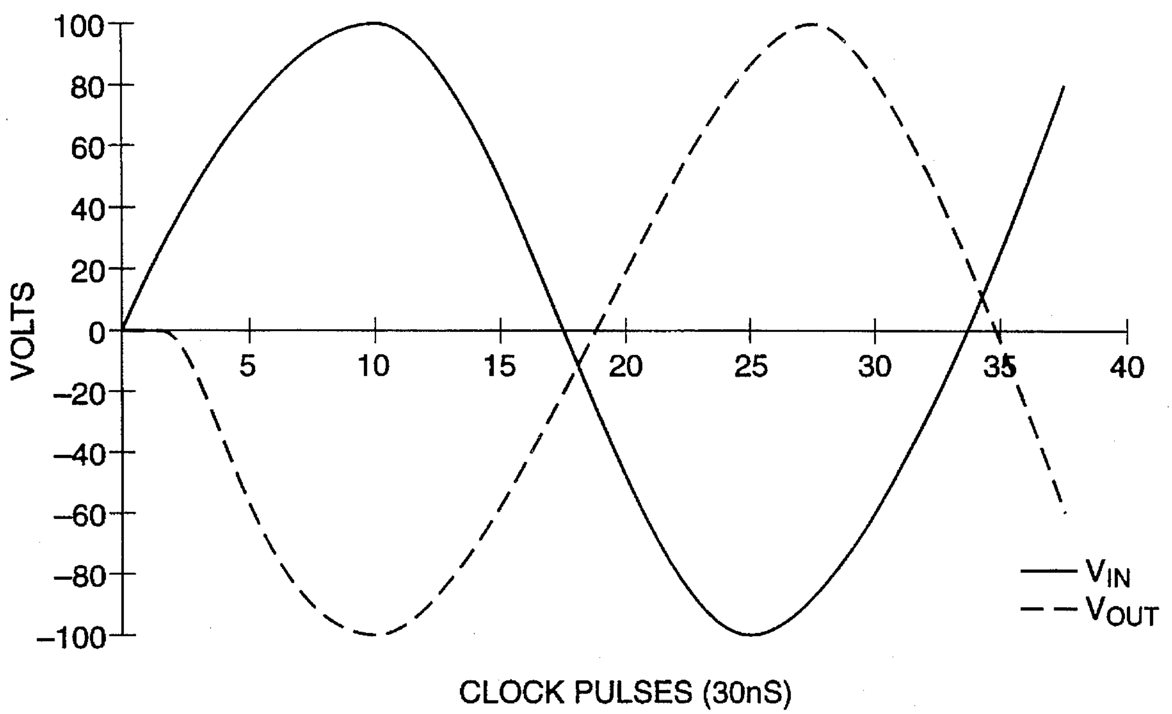
FIG. 8 is a graph showing the input and output voltages of the circuit of FIG. 7*b* for 1 MHz sine wave input.
Figure 9:
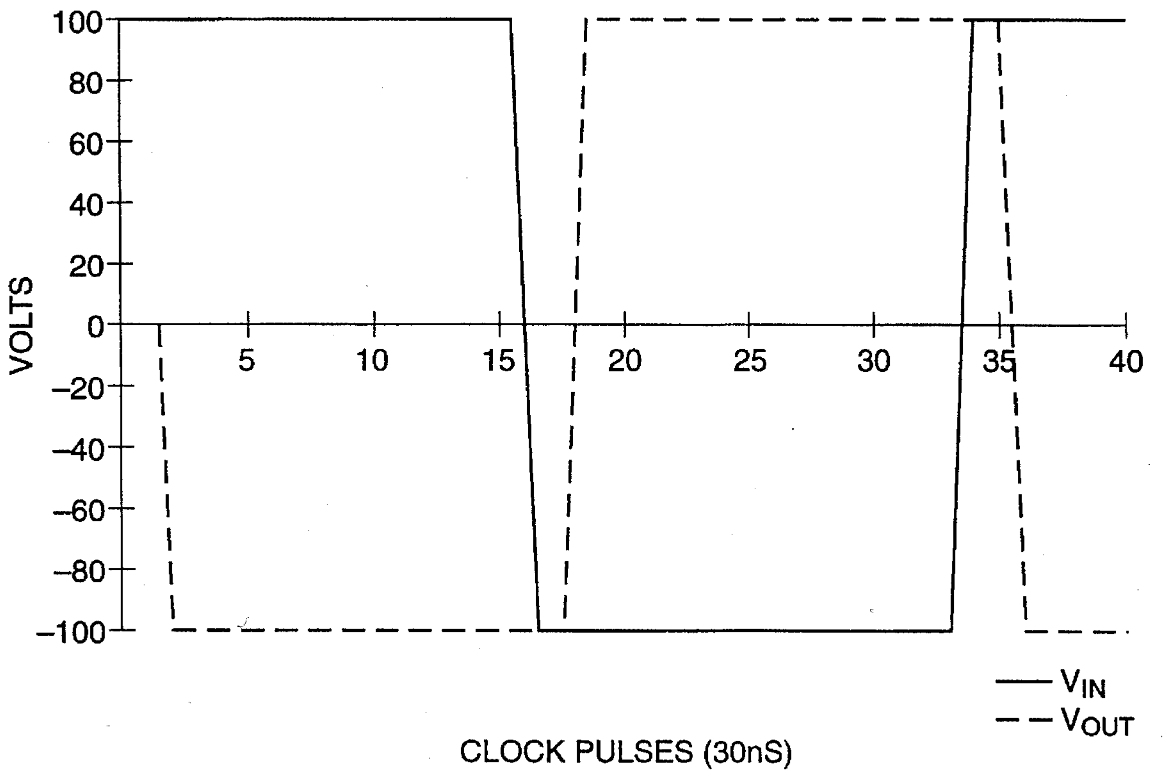
FIG. 9 is a graph showing the input and output voltages of the circuit of FIG. 7*b* for 1 MHz square wave input.

FIGS. 8 and 9 are graphs showing the input and output voltages of the circuit of FIG. 7*b* for 1 MHz sine and square wave inputs, respectively. Those of ordinary skill in the art will recognize that, while the phase of the output voltages are lagging the input voltages, the square wave output is completely free of overshoot. Such skilled persons will also recognize that, due to the slower clocking speed (i.e., 33 MHz as opposed to 100 MHz for the circuit of FIG. 4*b*), fewer data points are used to define the output function.

Another common problem encountered in analog electronics is that various parts of a complex signal must often be kept in phase while utilizing different circuit paths. A typical example of such a situation is in color television where the luminance information is routed through a delay line while the chrominance information is processed.

Figure 10:
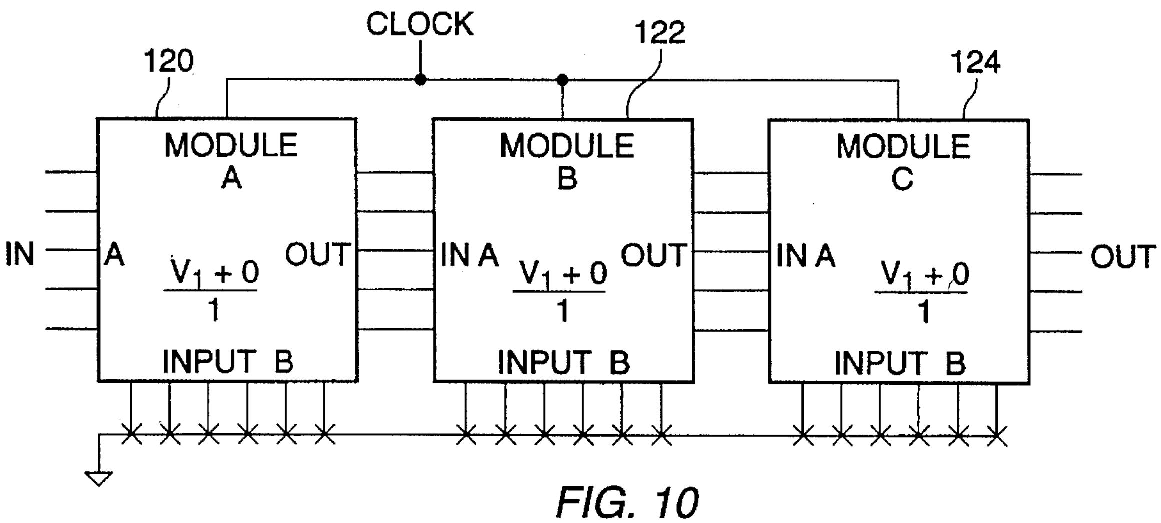
FIG. 10 is a block diagram of an illustrative analog shift register configured using the architecture of the present invention.

The architecture of the present invention may be used to implement an analog shift register as shown in FIG. 10, thus making possible any length delay without phase alteration. In the example of FIG. 10, three ALU modules 120, 122 and 124 are shown connected as an analog shift register. The ALU modules are configured to compute the function (V1+0)/1, by connecting the B input busses of each to ground and the A input busses of each module to the output bus of the preceding ALU module in the chain. This technique may be used to configure an analog shift register chain of arbitrary length, although only three stages are shown in FIG. 10.

The present invention may also be employed to simulate tuned circuits. Tuned circuits have to be designed with a specific frequency or continuum of frequencies, not just a factor of a square root of two (f=½πsqrtLC), as would be the case were L and C are limited to values equal to powers of 2. In digitally emulated tuned circuits according to the present invention, the actual value of the circuit element is also a function of the frequency at which the circuit is clocked. If the number that is output is the value of current, then the time period of the ALU clock signal will represent a current multiplied by time. Therefore the circuit output value is an amount of charge or Q.

As an example, a capacitor ALU having a digital value 1, clocked at a clock frequency of 100 MHz will be a value of C/clock frequency, or 10 nanofarads. Hence the actual value of the circuit elements will be set by the clock frequency of the ALU. This feature of the invention provides an added advantage in that the band pass frequency of a tuned circuit configured according to the present invention will change with the clock frequency. Using this feature of the present invention, applications such as frequency synthesizers and spectrum analyzers can be easily implemented.

Those of ordinary skill in the art will recognize that resonant circuits that have fractionally different resonant frequencies from one another will employ different clock frequencies in the same integrated circuit. It is apparent therefore that care must be taken to guarantee that the ALU circuits running at different frequencies will not read input values from neighboring ALU circuits during data transitions and thus read undetermined values.

One technique to avoid this problem in the circuits configured according to the present invention is to make a small FIFO of, for example, three signal bytes. This would require the use of three ALU circuits, unless the ALU circuits are optimized to perform this function. The load signal is determined by the output of one ALU circuit and the dump signal would be determined by the input ALU running at a different frequency. If the FIFO is full, one byte is erased and the next byte loaded. If the FIFO is empty, then the last byte is kept for the next read cycle. This is of course only one of many ways to perform this function. Another possible method is to design the ALU circuits with hand shaking such that the waiting module will not perform any function on the next clock cycle if the adjacent module is not ready to send or receive the data.

Work has been done in the past in an attempt to design processor arrays to speed up applications. These class of machines are called MIMD or SIMD (multiple instruction multiple data or single instruction multiple data). The MIMD and SIMD machines do not use interconnect to perform operations such as multiplication and division, and instead utilize the processor engines to perform these functions in the traditional manner. Nor do they utilize the concept of varying the processor clock frequency to vary the calculation result, as is employed in the present invention. Nor does any of this prior work disclose or suggest the idea of programming the interconnect to represent an analog function to run in real time. Also the processors in these arrays are very complex and are therefore stuck with the Von Neuman bottleneck, which is an undesirable characteristic thereof. The architecture of the present invention by its very nature requires each adder/shifter to perform only the one single function so there is no data bottleneck. This provides a significant advantage over the prior art.

Another advantage of modeling an analog circuit with an array of adders and shifters with programmable interconnect is that general integer arithmetic can be easily performed by combining adder/shifters. Hence the end user can design his device to multiply or divide a value by any integer when necessary. Since analog circuits typically move a signal along a circuit path with few feedback terms the additional time required for the integer arithmetic may not slow down the circuit as this architecture will basically pipeline the calculation so long as the calculation is not in a high speed feedback term.

The architecture of the present invention could be implemented in an FPGA but the modules in these devices are small and designed for logic functions, typically one bit wide. Hence many modules would have to be used to make a 10 bit adder and the interconnect architectures in FPGA devices do not provide a sufficient number of lines to efficiently implement the shift function in the interconnect. Hence the circuit cost per analog function will be high and the speed will be much slower. Additionally the modules in an FPGA are not designed to accept signals arriving asynchronously with the clock signal.

Circuits that utilize feedback that is running at the signal frequency, such as an RLC circuit where the components interact to form a tuned circuit represent the limiting frequency of the performance of this invention. This is caused by a phase shift between the signal and the reaction to that signal which represents at best one clock delay. For these applications the circuit will be more stable if the modules are clocked in series rather than in parallel. This of course causes the maximum operating frequency of the circuit to be limited (divided) by a factor of the number of series clock pulse used. Such a clocking scheme is useful for such applications for the Z transform for the specific circuit to be solved and applied to the module array as opposed to the just placing the circuit elements one to each module.

Figure 11A:
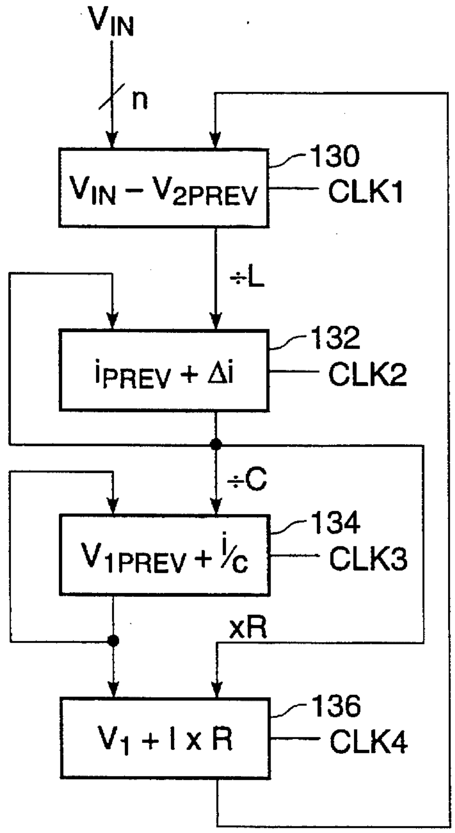
FIGS. 11*a* and 11*b* are examples of a series RLC tuned circuit implemented according to the present invention.
Figure 11B:
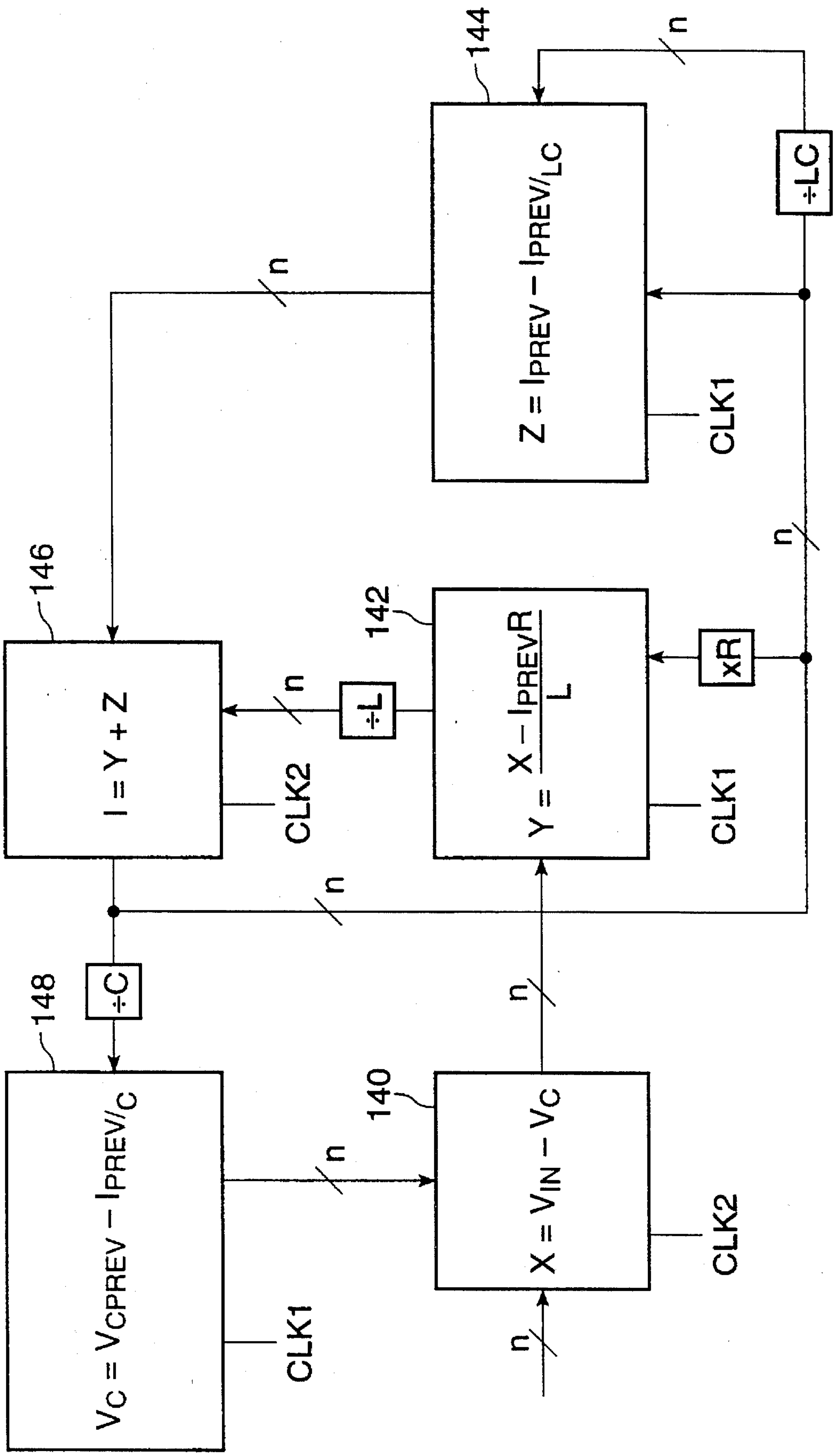

Two examples of a simple series RLC tuned circuit implemented using the architecture of the present are shown in FIGS. 11*a* and 11*b*. Turning first to the embodiment of FIG. 11*a* the straightforward placement requires four ALU modules 130, 132, 134, and 136, driven by four sequential clocks CLK1, CLK2, CLK3, and CLK4. The circuit is envisioned as an input node impressed with a voltage $V_{in}$ in series with an inductance L in series with a resistance R in series with a capacitance C to ground. ALU module 130, driven by CLK1, computes $V_{in}-V_{2prev}$, where $V_{2prev}$ is the voltage at the node joining the inductance L and resistance R at the last clock cycle. ALU module 132, driven by CLK2, computes $i_{prev}+\Delta i$, where $i_{prev}$ is the current through the RLC circuit at the previous clock cycle and $\Delta i$ is the change in current to the current clock cycle. The current is obtained by dividing the output of ALU module 130 by L (as noted in FIG. 11*a*). As taught herein, this may be done by the bit shifting technique disclosed with reference to FIG. 3 and accompanying disclosure.

ALU module 134, driven by CLK3, computes $V1_{prev}+i/C$, where $V1_{prev}$ is the voltage at the node connecting the resistance R to the capacitance C at the previous clock cycle and i/C is simply the current i (output of ALU module 132 divided by the capacitance C (:as noted in FIG. 11*a*) by the bit shifting technique. ALU module 136, driven by CLK4, computes V1+iR, where V1 is the voltage at the node connecting the resistance R to the capacitance C at the current clock cycle and iR is simply the current i (output of ALU module 132 multiplied by the resistance R (as noted in FIG. 11*a*) by the bit shifting technique.

As shown in FIG. 11*b*, judicious placement of the Z transform reduces the number of clocks to two and increases the number of ALU modules to five. The implementation of FIG. 11*b* doubles the maximum frequency. In this sense the present invention can be imagined as a parallel programmable Z transform.

In the embodiment of FIG. 11*b*, the input voltage $V_{in}$ is applied to ALU module 140, driven by CLK2, which computes $X=V_{in-Vc}$, where $V_c$ is the voltage across capacitance C in the present cycle. ALU module 142, driven by CLK1, computes the function $Y=(X-I_{prev}R)/L$, where X is the result of the calculation of ALU module 140, $I_{prev}$ is the current of the previous cycle, and R and L are the resistance and inductance, respectively. ALU module 144, driven by CLK1, computes $Z=I_{prev}-I_{prev}/LC$, where L and C are inductance and capacitance, respectively. ALU module 146, driven by CLK2, computes the function I=Y+Z, where I is the current of the present cycle, and Y and Z are the results of the last calculations made by ALU modules 142 and 144, respectively. ALU module 148, driven by CLK1, computes $V_c$, the voltage across the capacitance in the present cycle, as $V_{cprev}$, the voltage across the capacitance C in the previous cycle, minus the quantity $I_{prev}/C$.

Those of ordinary skill in the art will recognize that The term IR at one input to ALU module 142 may be obtained by the bit shifting techniques taught herein. Similarly, the terms $I_{prev}/C$ Of ALU module 148 and $I_{prev}/LC$ at the input to ALU module 144 may be similarly obtained. While this bit shifting multiply and divide technique does allow use of a minimal number of ALU modules, those of ordinary skill in the art will recognize that the values of the multiplicands and divisors are limited to integers which are powers of 2, i.e., 2 . . . 4 . . . 8 . . . 16 etc. Such skilled persons will recognize that divider and multiplier circuits may be configured from multiple ALU modules to provide more flexibility of component value choices at the expense of greater circuit complexity and ALU utilization.

Another nice feature of the present invention is that many circuit elements normally employed in analog circuits can be eliminated since no biasing, impedance matching, or buffering is necessary. A double balanced mixer configured using the architecture of the present invention requires only one module to perform the function IVC1+V2I/2. The module is programmed to add the two numbers and if the most significant bit is negative (signed integer) then perform the two's complement that the module would normally due for a subtract. The divide by two is done on the output to the interconnect. Hence three coupling transformers, two diodes and an amplifier are modeled by one module.

Variations in gain for circuits such as AGC circuits can be implemented as powers of two by designing the module interconnect with transistors that can be switched in the circuit, as opposed to hard wired interconnect with antifuses. Another method of varying gain would be to provide a resistor divider programmed into the modules wherein the resistor value is set in SRAM memory in the module that can be changed on the fly.

Sine wave oscillators are made with this architecture with only two clocks, one representing the L and one the C. Since these devices are mathematical there is no series resistance and therefore no damping of the oscillation. Hence the oscillator, once started, runs forever. By setting its initial conditions, the phase and amplitude are determined for every cycle until reset. Phase looked loops are therefore simple to implement. An excellent application would be synchronizing a 3.58 MHz oscillator to the color burst signal of a NTSC (TV) signal for decoding the color information. The clock frequency will change the oscillator frequency and the amplitude can be loaded at any time to synchronize with the input signal.

As mentioned earlier this technology can combine analog and digital functions with ease. An example would be the combining of a digital phase locked loop to generate the various clock frequencies required to run the different circuit blocks. This would reduce the need to input these signals from off chip and therefore increase speed and reduce pin count and power consumption, Another feature of this architecture is that once the signal is digitized a more complex system can be built by merely adding more chips. These would be designed such that all the digital outputs for a signal are adjacent and would match up to the inputs of another chip, allowing communicating pins from chips to be placed side by side. Lead lengths and capacitance loading are therefore minimized, allowing communication of the signal from one chip to the next at the maximum possible frequency. The signal need not be converted back to analog until necessary to return the signal to the real world (i.e. speaker or video monitor). Of course if the information goes to a computer then the signal need never be converted back to analog.

The modules may be designed with gated inputs to control the time a signal is loaded as is the case in synchronizing a signal or to steer the input as is the case with multiplexers.

If desired this architecture could integrate integer divide and multiply in the modules to perform the calculations thereby eliminating the requirement of using component values of a power of two. Clock frequencies would not therefore need to be fractionally different. This of course would lower the speed and density of the chip but it will still be considerably faster the conventional DSP chips as there still would be no Von Neuman bottleneck.

Some chips could be specialized by designing more specialized modules, optimized for special applications. For example, such a module could be optimized for the series RLC circuit example disclosed herein and could speed up the maximum chip operating frequency by about a factor of two.

From the above description, those of ordinary skill in the art will recognize that a field programmable version of the architecture of the present invention could be used to make prototype circuits, and that mask programmable versions of the present architecture could be used in a production environment. Such mask programmable versions fall within the scope of the present invention.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A field programmable, digital signal processing integrated circuit, comprising:

a plurality of input/output pads;

at least one analog to digital converter disposed in said integrated circuit, said at least one analog to digital converter having an analog input and a plurality of digital outputs;

at least one digital to analog converter disposed in said integrated circuit, said at least one digital to analog converter having a plurality of digital inputs and an analog output;

a plurality of ALU (arithmetic logic units) circuits disposed in the integrated circuit, each of said ALU circuits having a first input bus for supplying a first n-bit input byte to said ALU circuit on n first input lines, a second input bus for supplying a second n-bit input byte to said ALU circuit on n second input lines, and an output bus for supplying an n-bit output byte from said ALU circuit on n output lines;

means for individually defining the operation to be performed by each of said ALU circuits;

a plurality of interconnect conductors in the integrated circuit;

interconnect means for making programmable connections between the interconnect conductors, said inputs and outputs of said ALU circuits, said digital inputs and outputs of said at least one analog to digital converter, said digital inputs and outputs of said at least one digital to analog converter, and said input/output pads, at least some of said interconnect means being user programmable;

the n output lines of at least one of said ALU circuits intersecting n interconnect conductors to form intersections, said n interconnect conductors connectable to the input lines of other ones of said ALU circuits;

user-programmable interconnect elements disposed at said intersections; and means for programming ones of said user-programmable interconnect elements to cause a bit shift of m places in either of the left and right directions between data on said n output lines of said at least one of said ALU circuits and said n interconnect conductors, whereby multiplication and division operations may be performed on said data by virtue of programmable interconnection.

2. The field programmable, digital signal processing integrated circuit of claim 1, further including:

at least one PROM circuit disposed in said integrated circuit, said PROM including a plurality of address input lines and a plurality of data output lines;

interconnect means for connecting ones of said interconnect conductors to said plurality of address input lines and said plurality of data output lines of said at least one PROM circuit.

3. A field programmable, digital signal processing integrated circuit, comprising:

a plurality of input/output pads;

at least one analog to digital converter disposed in said integrated circuit, said at least one analog to digital converter having an analog input and a plurality of digital outputs;

at least one digital to analog converter disposed in said integrated circuit, said at least one digital to analog converter having a plurality of digital inputs and an analog output;

a plurality of ALU circuits disposed in the integrated circuit, each of said ALU circuits having a first input bus for supplying a first n-bit input byte to said ALU circuit on n first input lines, a second input bus for supplying a second n-bit input byte to said ALU circuit on n second input lines, and an output bus for supplying an n-bit output byte from said ALU circuit on n output lines;

means for individually defining the operation to be performed by each of said ALU circuits;

a plurality of interconnect conductors in the integrated circuit;

the n input lines of either of said first and second input bus of at least one of said ALU circuits intersecting n interconnect conductors in sets of ones of said interconnect conductors connectable to an output bus of another one of said ALU circuits to form intersections;

user-programmable interconnect elements disposed at said intersections; and means for programming ones of said user-programmable interconnect elements to cause a bit shift of m places in either of the left and right directions between data on said n interconnect conductors and on said n input lines of either of said first and second input bus of at said least one of said ALU circuits and, whereby multiplication and division operations may be performed on said data by virtue of interconnection.

4. A field programmable, digital signal processing integrated circuit, comprising:

a plurality of input/output pads;

at least one analog to digital converter disposed in said integrated circuit, said at least one analog to digital converter having an analog input and a plurality of digital outputs;

at least one digital to analog converter disposed in said integrated circuit, said at least one digital to analog converter having a plurality of digital inputs and an analog output;

a plurality of ALU circuits disposed in the integrated circuit, each of said ALU circuits having a first input bus for supplying a first n-bit input byte to said ALU circuit on n first input lines, a second input bus for supplying a second n-bit input byte to said ALU circuit on n second input lines, and an output bus for supplying an n-bit output byte from said ALU circuit on n output lines;

means for individually defining the operation to be performed by each of said ALU circuits;

a plurality of interconnect conductors in the integrated circuit;

interconnect means for making programmable connections between the interconnect conductors, said inputs and outputs of said ALU circuits, said digital inputs and outputs of said at least one analog to digital converter, said digital inputs and outputs of said at least one digital to analog converter, and said input/output pads, at least some of said interconnect means comprising user-programmable interconnect elements;

said n input lines of the first input bus of at least one of said ALU circuits intersecting n interconnect conductors in first sets of ones of said interconnect conductors connectable to an output bus of another one of said ALU circuits to form first intersections;

first user-programmable interconnect elements disposed at said first intersections;

means for programming ones of said first user-programmable interconnect elements to cause a bit shift of m places in either of the left and right directions between first data on said n interconnect conductors of said first sets of said interconnect conductors and the n input lines of the first input bus of said at least one of said ALU circuits, whereby multiplication and division operations may be performed on said first data by virtue of interconnection.

5. Tho field programmable, digital signal processing integrated circuit of claim 4, further wherein:

said n input lines of the second input bus of at least one of said ALU circuits intersecting n interconnect conductors in second sets of ones of said interconnect conductors connectable to an output bus of another one of said ALU circuits to form second intersections;

second user-programmable interconnect elements disposed at said second intersections;

means for programming ones of said second user-programmable interconnect elements to cause a bit shift of m places in either of the left and right directions between second data on said n interconnect conductors of said second set of said interconnect conductors and the n input lines of the second input bus of said at least one of said ALU circuits, whereby multiplication and division operations may be performed on said second data by virtue of interconnection.

* * * * *

UNITED STATES PATENT AND TRADEMARK OFFICE

CERTIFICATE OF CORRECTION

PATENT NO. : 5,457,644

DATED : October 10, 1995

INVENTOR(S) : John L. McCollum

It is certified that error appears in the above-indentified patent and that said Letters Patent is hereby corrected as shown below:

Column 1, line 23, after "specialized" replace "," with --.--.

Column 6, line 61, replace "0R" with --OR--.

Column 7, line 3, replace "B Latch" with --Latch B latch--.

Column 7, line 25, after the second occurrence of "B", delete ",".

Column 12, line 39, after "(" delete ":".

Signed and Sealed this

Eleventh Day of June, 1996

Attest:

Bruce Lehman

BRUCE LEHMAN

*Attesting Officer*

*Commissioner of Patents and Trademarks*